K. W. HEYMAN.
MILK DISTRIBUTING CAR.
APPLICATION FILED FEB. 26, 1913.

1,064,324.

Patented June 10, 1913.

WITNESSES:—
Charles B. Crompton
John A. Percival

K. W. HEYMAN,
INVENTOR.
By Croyden Marks
ATTORNEY.

UNITED STATES PATENT OFFICE.

KNUT WALDEMAR HEYMAN, OF STOCKHOLM, SWEDEN.

MILK-DISTRIBUTING CAR.

1,064,324.  Specification of Letters Patent.  Patented June 10, 1913.

Application filed February 26, 1913. Serial No. 750,838.

*To all whom it may concern:*

Be it known that I, KNUT WALDEMAR HEYMAN, a subject of the King of Sweden, and resident of 57 Strandvägen, Stockholm, in the Kingdom of Sweden, director, have invented certain new and useful Improvements in Milk-Distributing Cars, of which the following is a specification, reference being made to the accompanying drawing.

The present invention relates to improvements in milk distributing cars.

A milk distributing car carried out in accordance with this invention is characterized chiefly by the combination of a chamber containing a milk reservoir (or reservoirs) and limited by the side walls of the car, this chamber being shut off from the atmosphere during the removal of the car as well as during the distribution of milk, another chamber, in which the tapping of the milk into small vessels takes place and which is likewise shut off from the atmosphere during the removal of the car and the distribution of the milk, and a device mounted in a wall or a door of the tapping chamber and permitting the delivery out of the car of filled vessels while simultaneously preventing the influx of air, carrying along with it dust and infectious matter, into the tapping chamber. Through this combination is obtained a milk distributing car which is suitable in the use and answers the requirements of hygiene.

In the accompanying drawing is shown by way of example a milk distributing car constructed in accordance with this invention.

Figure 1:
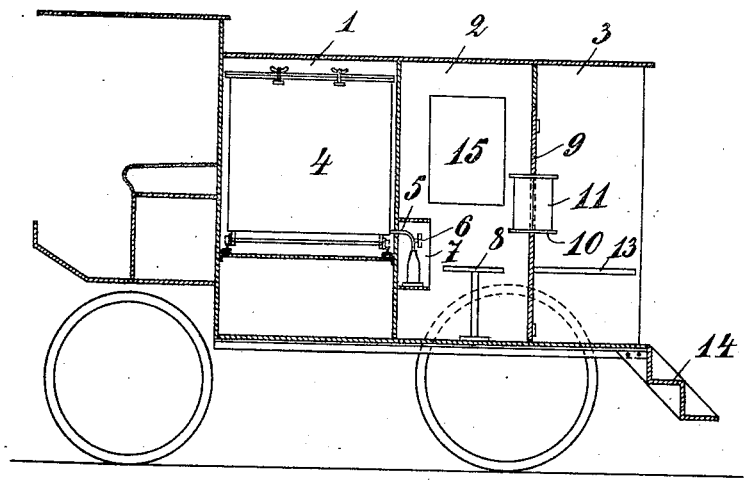
Figure 2:
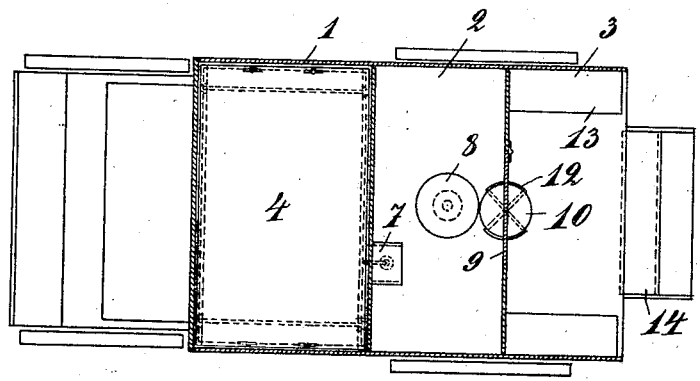

Figure 1 shows a vertical section and Fig. 2 a horizontal section of the car.

That part of the body of the car which is situated behind the driver's box is divided by means of vertical walls, into three chambers 1, 2, and 3, of which the front chamber 1 contains the milk reservoir 4 of the car, which milk reservoir runs on rails, so that it can easily be pushed into and pulled out of the car. The intermediate chamber 2 is intended for a person who draws off the milk into small vessels. The front wall of this chamber is traversed by a pipe 5 extending from the milk reservoir 4 and provided with a cock 6, which is contained in a box 7 fixed to the front wall of the chamber 2 and in which the vessels are placed, when they are to be filled. The person occupied with the tapping, which person sits on a chair 8, receives empty vessels and delivers filled vessels through a device mounted in the back wall of the chamber 2 or in a door 9 arranged in it, which device in the greatest possible degree prevents a draft of air, which carries along with it dust and infectious matter, entering into the tapping chamber 2. The device for this purpose shown in the drawing is constructed according to the principle of so-called cross doors. It consists of two disks 10 rotatable around a vertical axis, between which disk 10 run two walls 11 crossing each other in the said axis, besides which along each side of the rotatable frame of the device there is fixed at the door 9 a plate 12 bent in a quarter circle; the free edges of the walls 11 move as closely as possible along the inner sides of the plates 12. The vessels are placed on the lower one of the disks 10 and are moved, by turning the frame 10, 11, out of or into the chamber 2, which is thus, at this device as well as at all other places (*e. g.* at the door 9) shut off from the atmosphere so as to be free from draft. The back chamber 3 (the despatch chamber), in which the messengers accompanying the car, through the device in the door 9, receive filled vessels and deliver empty ones, is also intended to provide accommodation for the messengers, especially during a long removal of the car, and is therefore provided with seats 13. From the back part of this chamber descend steps 14.

The tapping room 2 receives light through windows 15 in the side walls of the car.

The car may be provided with serviceable devices for keeping the milk at a suitable temperature, for heating the tapping chamber, as well as for supplying it with pure, fresh air.

As will be seen, the reservoir chamber 1 (as well as the tapping chamber 2) is limited by the side walls of the car.

A distributing car carried out in accordance with this invention may be arranged in another way than that given by way of example. It may, for instance, be provided with a cream reservoir and a tapping device belonging thereto. The despatch chamber may be placed at the side of the tapping chamber. The delivery-out of the filled vessels and the delivery-in of the empty ones may take place each through a special device of its own, preventing the influx of air.

Having now described my invention, what I claim as new and desire to secure by Letters Patent is:

A milk distributing car, characterized by the combination of a chamber containing a milk reservoir (or reservoirs) and limited by the side walls of the car, this chamber being shut off from the atmosphere during the removal of the car as well as during the distribution of milk, another chamber, in which the tapping of the milk into small vessels takes place and which is likewise shut off from the atmosphere during the removal of the car and the distribution of the milk, and a device mounted in a wall or a door of the tapping chamber and permitting the delivery out of the car of filled vessels while simultaneously preventing the influx of air, carrying along with it dust and infectious matter, into the tapping chamber.

In witness whereof I have hereunto set my hand in presence of two witnesses.

KNUT WALDEMAR HEYMAN.

Witnesses:
GUSTA PRIM,
HANS B. OHLSSON.